1,439,603

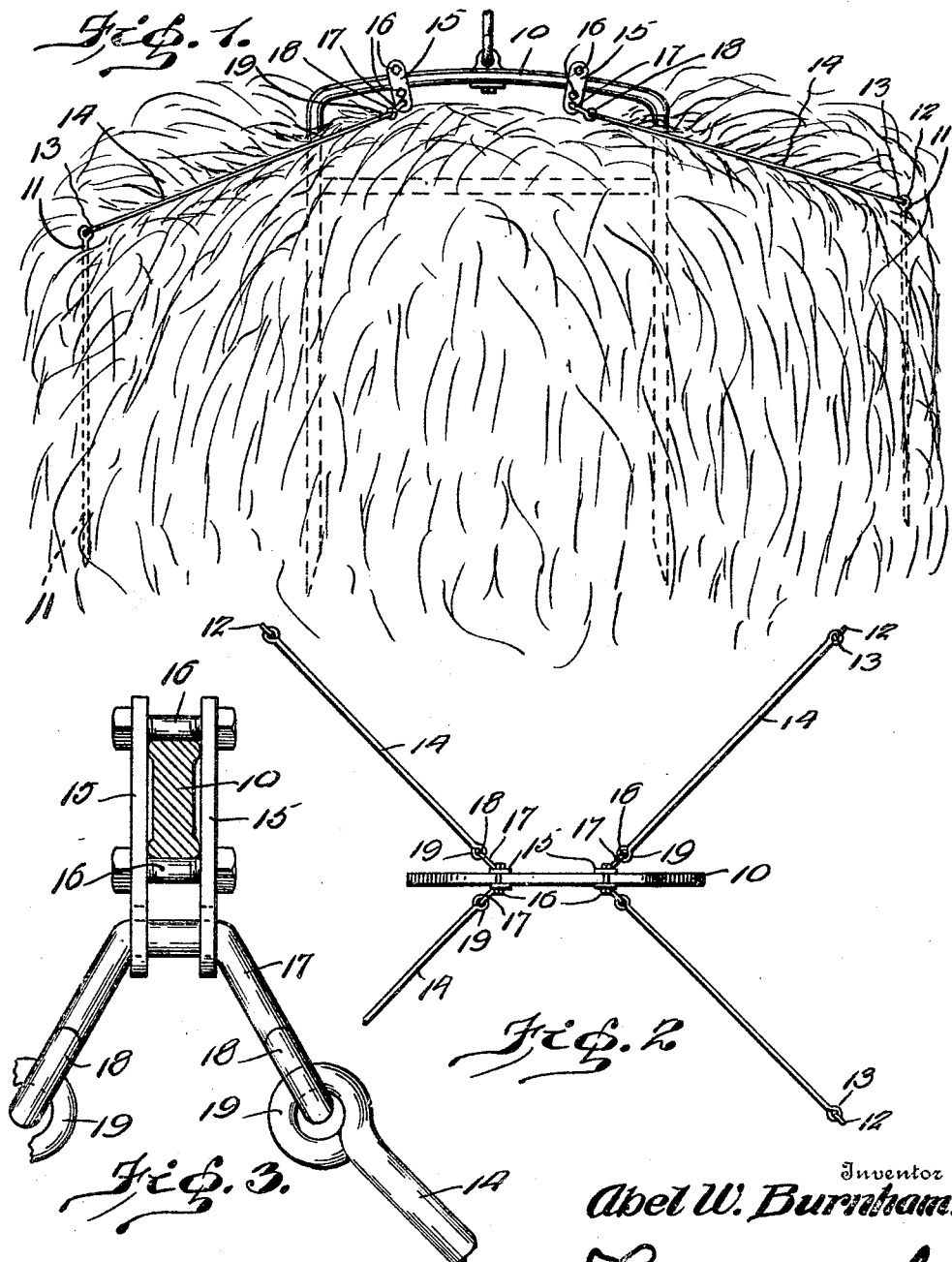
Dec. 19, 1922. 1,439,603.
A. W. BURNHAM.
ATTACHMENT FOR HAYFORKS.
FILED NOV. 1, 1921.
Inventor
Abel W. Burnham.
By Franklin H. Hough
Attorney Patented Dec. 19, 1922.

UNITED STATES PATENT OFFICE.

ABEL W. BURNHAM, OF AMBOY, ILLINOIS.

ATTACHMENT FOR HAYFORKS.

Application filed November 1, 1921. Serial No. 512,017.

*To all whom it may concern:*

Be it known that I, ABEL W. BURNHAM, a citizen of the United States, residing at Amboy, in the county of Lee and State of Illinois, have invented certain new and useful Improvements in Attachments for Hayforks, of which the following is a specification, reference being had therein to the accompanying drawings.

This invention relates to hay fork attachments and has for an object to provide a device for connection and operation in conjunction with a hay fork tending to maintain the compactness of the hay surrounding the fork whereby a greater amount of hay may be elevated by the fork at a single operation.

A further object of the invention is to provide in combination with a hay fork of the usual and ordinary type, pins or penetrating rods inserted into the hay at spaced intervals surrounding the fork and with connections from the pins to the fork whereby the pins are withdrawn from the hay when the hay is discharged from the fork.

With these and other objects in view the invention comprises certain novel parts, elements, units, constructions, combinations and arrangements, as disclosed in the drawings, together with mechanical equivalents thereof, as will be hereinafter more fully described and claimed.

In the drawings:

Figure 1 is a view in side elevation of part of a conventional hay fork with the present invention attached thereto;

Figure 2 is a top plan view of the organization; and

Figure 3 is an enlarged detail view showing the manner of attaching the invention to the hay fork.

Like characters of reference indicate corresponding parts throughout the several views.

The present invention is intended to operate in conjunction with hay forks of various types and makes and the showing of a hay fork at 10 is not intended in any way to limit the utility of the present invention to co-action with such a fork as that represented. Essentially, the invention comprises a plurality of pins 11 which are inserted into the hay at a distance from the hay fork and preferably, though not necessarily, corresponding substantially with a circle surrounding the median line of the fork. As shown at Figure 2, four of these pins are employed, but it is to be understood that the number may be more or less and fall within the scope of the present invention. These pins are inserted into the hay to a depth corresponding substantially to the penetration of the fork itself and are secured to the fork by any approved flexible means. As shown in the drawings the upper or top ends of these pins 11 are flattened as at 12 and through such flattened portion the eyes 13 of rods 14 are pivoted.

The opposite ends of these rods 14 are pivotally secured to the fork in any approved manner, as, for instance, by applying clips or plates 15 which are clamped upon the opposite sides of the fork structure in any approved manner, as by the use of bolts 16.

The clips 15 are provided with perforations through which approximately U-shaped hinged members 17 are inserted, as shown more in detail at Figure 3, such U-shaped members being provided with eyes 18 making pivotal connection with eyes 19 in the ends of the rods 14.

While this is found a convenient means of applying the attachment to hay forks already manufactured and in use, it will be obvious that the fork may originally be constructed in such manner as to accommodate the structure herein disclosed without in any way departing from the invention or without the exercise of more than mere mechanical skill.

In operation the hay fork will be set into the hay in the usual and ordinary manner, following which the pins will be inserted by taking advantage of the two pivot-joint connections between such pins and the fork, resulting in positioning the members substantially as shown at Figure 1. After the fork has been raised, raising the hay connected therewith and transported to the mow, the release of the hay from the fork by tripping in the usual manner will result in the dropping of the hay from the fork and also, as will be apparent from the pins, which, by reason of their pivotal connection, will fall to occupy a substantially vertical line from their point of connection with the fork. In this position the fork is returned to the load as usual and the device is then ready for repeating.

What I claim is:

1. The combination with a hay fork of a plurality of pins proportioned to penetrate a mass of hay to a depth substantially equal to the fork and pivotal means positioning the pins at spaced points surrounding the fork.

2. The combination with a hay fork of a plurality of pins proportioned to penetrate a hay mass to substantially the same depth as the tines of the fork, and rods having corresponding ends pivotally connected with the fork and their opposite ends pivotally connected with the pins and extending from the fork substantially radially positioning the pins at spaced points surrounding the fork.

3. An attachment for hay forks comprising a plurality of pointed rods, links pivotally connected with the upper ends of the rods, and means to pivotally connect the ends of the links opposite the rods with a hay fork.

4. An attachment for hay forks comprising spaced parallel prongs consisting in a plurality of other prongs pivotally connected to the fork and adapted to be inserted into the load also in parallelism with the prongs of the fork.

In testimony whereof I hereunto affix my signature in presence of two witnesses.

ABEL W. BURNHAM.

Witnesses:
E. J. GRAY,
R. S. BROMEN.